United States Patent [19]

Magne

[11] Patent Number: 5,547,618
[45] Date of Patent: Aug. 20, 1996

[54] METHOD AND DEVICE FOR MANUFACTURING AN OPTICAL LENS FROM A POLYMERIZABLE SYNTHETIC MATERIAL

[75] Inventor: Jean-Francois Magne, Creteil, France

[73] Assignee: Essilor International Compagnie Generale d'Optique, Charenton Cedex, France

[21] Appl. No.: 370,973

[22] Filed: Jan. 10, 1995

[30] Foreign Application Priority Data

Dec. 12, 1994 [FR] France .................................. 94 14927

[51] Int. Cl.⁶ ..................................................... B29D 11/00
[52] U.S. Cl. ................... 264/1.360; 264/2.5; 425/174.4; 425/808; 425/812; 425/175
[58] Field of Search ................................. 264/1.36, 1.38, 264/2.2, 1.32, 2.5; 425/808, 175, 174.4, 812

[56] References Cited

U.S. PATENT DOCUMENTS

| | | | |
|---|---|---|---|
| 2,542,386 | 2/1951 | Beattie | 425/808 |
| 3,297,422 | 1/1967 | Emerson et al. | 425/808 |
| 3,605,195 | 9/1971 | Campbell | 425/808 |
| 3,938,775 | 2/1976 | Sarofeen | 425/808 |
| 4,257,988 | 3/1981 | Matos et al. | 425/808 |

FOREIGN PATENT DOCUMENTS 2082107  3/1982  United Kingdom .................. 264/1.38

*Primary Examiner*—Mathieu D. Vargot
*Attorney, Agent, or Firm*—Young & Thompson

[57] ABSTRACT

In a method of manufacturing an optical lens from a polymerizable synthetic material a lens molding assembly is provided including two molding shells and an annular closure member disposed around the molding shells and defining therewith a required molding cavity. The mold is filled with molding material and polymerization of the molding material is at least started. The operations of assembling the mold, filling it and at least starting polymerization of the molding material are conducted in the lens molding assembly.

17 Claims, 1 Drawing Sheet

U.S. Patent    Aug. 20, 1996    5,547,618

METHOD AND DEVICE FOR MANUFACTURING AN OPTICAL LENS FROM A POLYMERIZABLE SYNTHETIC MATERIAL

BACKGROUND OF THE INVENTION

1. Field of the Invention

The present invention concerns the manufacture of optical lenses and especially, but not exclusively, ophthalmic lenses from polymerizable synthetic materials.

2. Description of the Prior

Three operations are involved in the manufacture of an optical lens.

The first step is to assemble the mold which conventionally comprises two molding shells and an annular closure member fitting around the molding shells to define therewith the required molding cavity.

Next, the molding assembly is filled with the molding material, conventionally by pouring the molding material into the molding cavity through an opening provided for this purpose in the closure member at the periphery of the molding shells.

The final operation is to polymerize the molding material and the present invention is more especially, but not exclusively, concerned with the situation in which polymerization is at least begun by exposure.

At present these three operations of assembling the mold, filling the mold and at least starting polymerization of the molding material are conducted at different stations.

First the mold is assembled at an assembly station where the annular closure member to fit around the molding shells is usually separate from the molding shells, being either a seal in which the molding shells are nested or a sleeve which fits around their edge.

Next is a dedicated filling station where, by process that is at least in part automated, the mold to be filled is placed under a filling device which delivers a specific dose of molding material to it via a nozzle.

Finally, polymerization is at least started at another dedicated station at which the mold filled with polymerizable synthetic material is exposed to the necessary source of radiation and/or heat.

Conveyor means are required for transferring the molds between the stations, almost always with intermediate storage.

The process is therefore complex, which increases costs.

A general object of the present invention is to provide a more economical method of manufacturing a polymerizable synthetic material optical lens and a device for implementing this method.

SUMMARY OF THE INVENTION

The present invention consists in a method of manufacturing an optical lens from a polymerizable synthetic material in which a mold is assembled comprising two molding shells and an annular closure member disposed around said molding shells and defining therewith a required molding cavity, said mold is filled with molding material and polymerization of said molding material is at least started, in which method the operations of assembling said mold, filling it and at least starting polymerization of said molding material are conducted in the same device.

Productivity is therefore improved because there is no need for conveyor means or intermediate storage means between the various operations.

In another aspect, the present invention consists in a molding assembly for manufacturing an optical lens from a polymerizable synthetic material by the method as defined above including at least two jaws which, to constitute a mold, are adapted to enclose conjointly two molding shells, forming with a closure member for them defining with them a required molding cavity, at least one of said jaws being mobile.

Two jaws are sufficient in practise, engaged with a common frame, at least one of them being mobile in translation on the frame.

The molding assembly of the invention is itself sufficient for assembling the mold, given that all that is required is to place the two molding shells between its jaws. The device also simplifies assembly to a remarkable degree.

With the molding assembly of the invention the assembled mold is filled in situ since all that is required is a hole through one jaw whose outlet forms the casting opening, this hole being connected to any form of conduit for filling the mold.

Finally, the molding assembly of the invention enables polymerization of the molded material to be molded to be at least started in the mold by means of source of radiation, for example a source of ultraviolet radiation, positioned in alignment with at least one of the molding shells, the latter being transparent to the radiation which is at least to start polymerization of the molding material. In the case of ultraviolet radiation, the molding shells have the necessary transparency because they are usually made of glass.

A lens manufacturing station of this kind comprising a molding assembly and a means for at least starting polymerization has the advantage of enabling manufacture of finished or semi-finished optical lenses with any edge and center thickness.

The edge thickness is in practise limited only by total obstruction of the casting opening by the two molding shells.

The edge thickness of a semi-finished optical lens can be up to 10 mm, for example, and the center thickness of a finished lens can in some cases be in the order of 1 mm.

Lenses made with the device of the invention have the additional advantage of greater reliability (i.e. fewer optical defects such that they have to be rejected) if, in a preferred embodiment of the process of the invention, the casting opening through which the molding cavity is filled is in the lower part of the molding cavity, to be more precise at its lowest point.

The features and advantages of the invention will emerge from the following description given by way of example with reference to the accompanying diagrammatic drawings.

DETAILED DESCRIPTION OF THE PREFERRED EMBODIMENT

Figure 1:
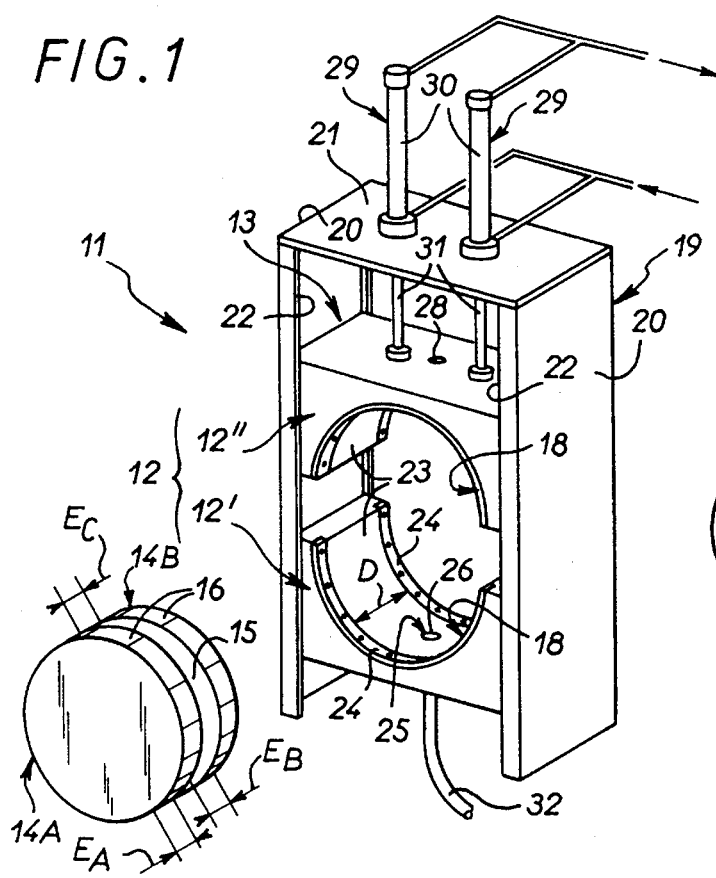
FIG. 1 is a perspective view of a molding assembly of the invention.

The figures show the manufacture of an optical lens 10 by molding it from a polymerizable synthetic material.

If the optical lens 10 is an ophthalmic lens, the process manufactures the blank from which the ophthalmic lens is then made; the blank is usually circular, but this is not always the case.

The molding assembly or device 11 of the invention includes at least two jaws 12', 12" which, to constitute a mold 13, fit together around two substantially parallel molding shells 14A, 14B. The jaws form a closure member 12 for the molding shells 14A, 14B, defining with them the molding cavity 15. At least one jaw is mobile.

The molding shells 14A, 148 are well known in themselves.

Their facing inside surfaces constitute a negative image of the required surfaces of the optical lens 10 to be molded.

Let $E_A$, $E_B$ denote the thickness of the molding shells 14A, 14B along their edge 16 and $E_C$ denote the distance between them required to constitute the molding cavity 15.

In the embodiment shown the molding assembly on device 11 of the invention has only two jaws 12', 12" and the inside surface 18 of each jaw is generally semi-cylindrical, with the same radius as the outside contour of the molding shells 14A, 14B.

The two jaws 12', 12" are engaged with a common frame 19 and at least one of them is mobile in translation on the frame 19.

In the example shown the frame 19 comprises two side flanges 20 and a crossmember 21 which joins the side flanges 20 together at one end.

In the embodiment shown the side flanges 20 are vertical and parallel and the crossmember 21 extends horizontally between their upper ends.

The two jaws 12', 12" are staggered vertically on the frame 19, along the side flanges 20, and the axis of their interior surface 18 is therefore horizontal.

The mold 13 that they form with the molding shells 14A, 14B therefore also has a horizontal axis.

In the embodiment shown only one of the jaws 12', 12" is mobile in translation on the frame 19, the other being fixed to and therefore fixed with respect to the frame 19.

The bottom jaw 12' is fixed, for example, and the top jaw 12" is mobile, sliding in grooves 22 provided for this purpose on the frame 19, to be more precise on the inside surface of its side flanges 20.

Each of the two jaws 12', 12" is a solid block of metal whose exterior contour is parallelepiped shape, except for the recess forming the interior surface 18.

Their ends are interengaged by nesting in the grooves 22 on the frame 19.

The inside surface 18 of the jaws 12', 12" preferably has a synthetic material lining 23.

The lining 23 is fixed by a semi-circular clamp 24 at each end of the interior surface 18.

The distance D between the two clamps 24 on each jaw 12', 12" is greater than the sum of the thickness $E_A$, $E_B$ of the molding shells 14A, 14B and the distance $E_C$ between them.

The two jaws 12', 12" are identical.

In the embodiment shown the bottom jaw 12' has a hole 25 through it opening onto its inside surface 18 at a casting opening 26 for the molding cavity 15. There is a vent hole 28 through the top jaw 12".

The casting opening 26 is preferably on the lowest generatrix of the inside surface 18 of the bottom jaw 12', as shown here. Likewise, the hole 28 in the top jaw 12" preferably opens onto the highest generatrix on its inside surface 18.

The mobile jaw 12" is moved by at least one double-acting ram 29.

In the embodiment shown two parallel double-acting rams 29 are used.

Their cylinder 30 is carried by the crossmember 21 of the frame 19. Their piston rod 31 is coupled to the mobile jaw 12".

The fixed jaw 12' is fixed to the frame 19 by any appropriate means. It is welded or bolted to the frame, for example.

These provisions will be evident to the person skilled in the art will not be described here.

The hole 25 in the fixed jaw 12' is connected to a pipe 32 for connecting the mold cavity 15 to a supply of the molding material (not shown).

The device 11 of the invention can be used in the following manner, for example:

The first step is to assemble the molding assembly 13.

Figure 2A:
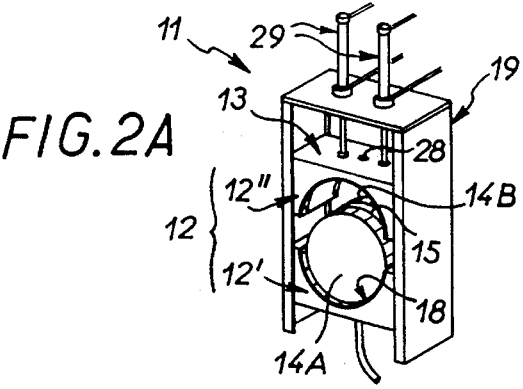
FIGS. 2A, 2B, 2C, 2D are perspective views to a smaller scale, deduced from FIG. 1, showing various successive phases of use of the molding assembly.

Assuming that the top jaw 12" is moved away from the bottom jaw 12', the molding shells 14A, 14B are placed on the bottom jaw 12', simply nesting in its inside surface 18; they are disposed on edge, parallel to each other and separated by the distance $E_C$ appropriate to the molding cavity 15 to be formed (FIG. 2A).

Simply nesting the molding shells 14A, 14B in the inside surface 18 of the jaw 12' holds them in place.

Figure 2B:
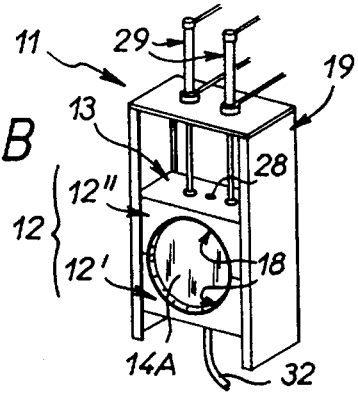

The jaw 12" is then lowered by the double-acting rams 29 until its inside surface 18 contacts the edge of the molding shells 14A, 14B (FIG. 2B).

Now that the mold 13 has been closed, it can be filled with the necessary quantity of molding material through the pipe 32.

Pumping means feed molding material continuously (i.e. smoothly) into the molding cavity 15, for example.

As these provisions are not relevant to the present invention they will not be described.

The molding material is then exposed in order to start its polymerization.

Figure 2C:
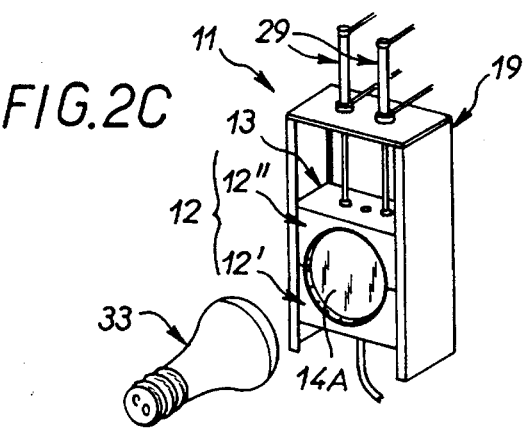

To this end the molding assembly on device 11 of the invention is associated with a source 33 of radiation which is brought into position in alignment with one at least of the molding shells 14A, 14B, in this example with the molding shell 14A (see FIG. 2C). The combination of the molding assembly and the source of radiation comprising a lens manufacturing station.

The source 33 of radiation is a source of ultraviolet radiation, for example.

The molding shell 14A being made of glass, for example, it is at least partially transparent to the ultraviolet radiation so that polymerization of the molding material can at least be started, as required.

The foregoing description shows that, in accordance with the invention, the operations of assembling the mold 13, filling it and at least starting polymerization of the molding material are conducted in the same device, namely the device 11.

Figure 2D:
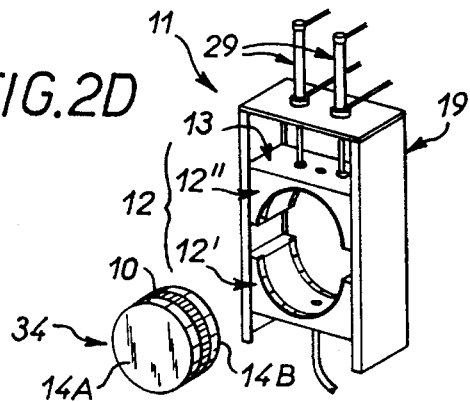

The polymerization of the optical lens 10 having been completed or having reached a sufficient degree, the mold 13 is opened by raising the top jaw 12" by means of the double-acting rams 29 (FIG. 2D). The assembly 34 comprising the optical lens 10 and the two molding shells 14A, 14B enclosing it is then removed from the bottom jaw 12'.

Figure 3:
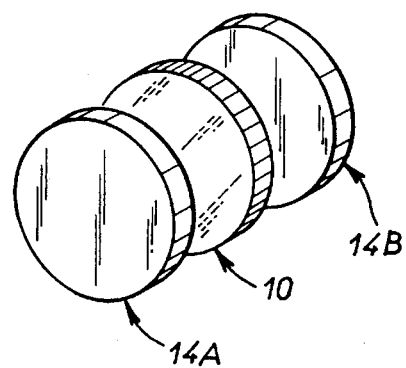
FIG. 3 is a perspective view to the same scale as FIG. 1 showing removal from the mold of the optical lens made using the molding assembly.

Referring to FIG. 3, after completion of polymerization of the molded material, if removed from the mold when only partly polymerized, it remains merely to remove the molding shells 14A, 14B from the optical lens 10.

Of course, the present invention is not limited to the embodiment and application described and shown but encompasses all variant executions thereof.

For example, the number of jaws that the device of the invention includes may be greater than two and/or, rather than being mobile in translation, one of these jaws can be mobile in rotation, for example, pivoting on the other jaw, for example.

Further, the mold that they form with the molding shells does not necessarily have a horizontal axis, and the axis can equally well be vertical, for example.

Finally, although it is preferable to fill the mold from the bottom, this is not essential.

There is claimed:

1. Method of manufacturing an optical lens from a polymerizable synthetic material comprising the steps of: providing two molding shells and an annular closure member defined by clamping jaws; positioning the molding shell between the clamping jaws and closing the clamping jaws; the molding shells and clamping jaws together forming a molding cavity; filling the molding cavity with molding material; commencing polymerization of the molding material inside the molding cavity whereby before removing the molding shells from the jaws the material thus molded is at least partially polymerized.

2. Method according to claim 1 wherein at least one of said jaws is mobile between a closed and open position respectively for closing the molding cavity and for loading and unloading the molding shells.

3. Method according to claim 1 wherein said molding shells are arranged in said jaws in upright position, a casting opening being disposed in one of the jaws for introduction of said molding material into the molding cavity and located proximate the lowest part of the molding cavity.

4. Method according to claim 3 wherein the casting opening is at the lowest point of the molding cavity.

5. Method according to claim 1 wherein polymerization of said molding material is at least started by exposure to radiation and a source of radiation is disposed in line with at least one of the molding shells.

6. Manufacturing station for manufacturing an optical lens from a polymerizable synthetic material comprising two molding shells and opposed clamping jaws having an open position for loading and unloading the molding shells and a closed position for clamping the molding shells therebetween in spaced relation and defining an annular closure member, said molding shells and clamping jaws together defining a molding cavity in the closed position of the clamping jaws, means for filling the molding cavity with molding material, and means for at least commencing polymerization of the material thus molded in situ inside the molding cavity whereby before removing the molding shells from the jaws the molded material is at least partially polymerized.

7. Manufacturing station according to claim 6 where there are two said jaws each having a semi-cylindrical inside surface together comprising a circumferentially extending lateral wall of the molding cavity.

8. Manufacturing station according to claim 7 further comprising a common frame, said jaws being engaged in said frame and at least one of the jaws mounted for translatory movement on said frame between open and closed positions.

9. Manufacturing station according to claim 8 wherein only one of said jaws is mounted for translatory movement on said frame, and the other of said jaws is fixed to said frame.

10. Manufacturing station according to claim 8 wherein opposed ends of the at least one of said jaws are received in grooves on said frame for sliding movement.

11. Manufacturing station according to claim 8 further comprising at least one double-acting actuator for moving said at least one jaw between its open and closed positions.

12. Manufacturing station according to claim 8 wherein said jaws are vertically spaced from each other on said frame, said jaws having inside surfaces with a horizontal axis.

13. Manufacturing station according to claim 12 wherein said at least one jaw is movable and comprises a top jaw and the other jaw is fixed and comprises a bottom jaw.

14. Manufacturing station according to claim 13 wherein said bottom jaw has a hole defining a casting opening and said top jaw has a vent hole extending therethrough.

15. Manufacturing station according to claim 14 wherein said casting opening lies on a lowest generatrix of the inside surface of said bottom jaw.

16. Manufacturing station according to claim 6 wherein each of said jaws comprises a block of metal having an surface with a synthetic material lining.

17. Manufacturing station according to claim 6 wherein said means for at least commencing polymerization comprises a source of radiation for polymerization of the molding material aligned with one of the shells.

\* \* \* \* \*